Figure 11:
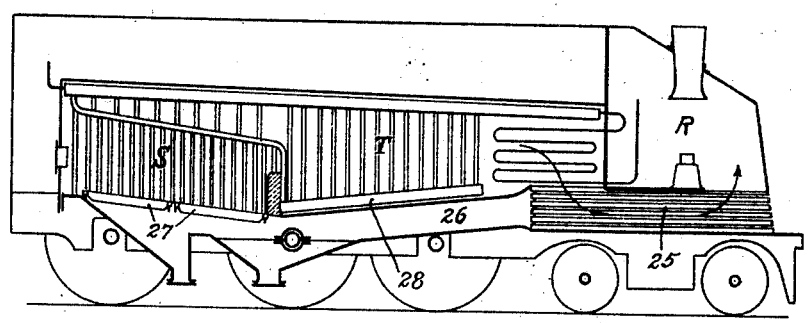

April 10, 1928.
O. H. HARTMANN
1,665,543
TRAVELING PLANT FOR THE GENERATION OF HIGH PRESSURE STEAM
Filed Sept. 23, 1924
4 Sheets-Sheet 1
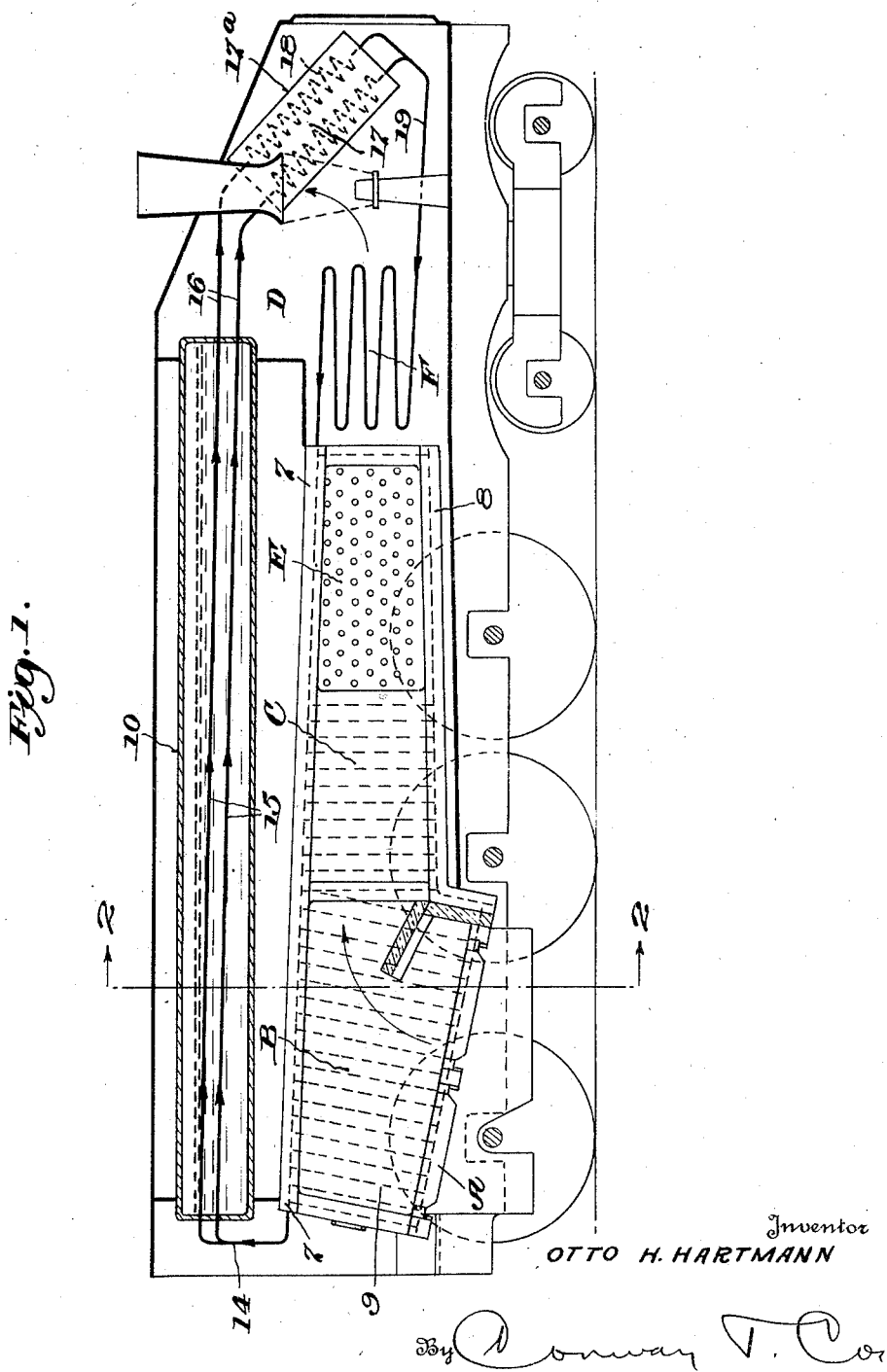
Inventor
OTTO H. HARTMANN
Attorney April 10, 1928.　　　　　　　　　　　　　　　　　　1,665,543
O. H. HARTMANN
TRAVELING PLANT FOR THE GENERATION OF HIGH PRESSURE STEAM
Filed Sept. 23, 1924　　　4 Sheets-Sheet 2
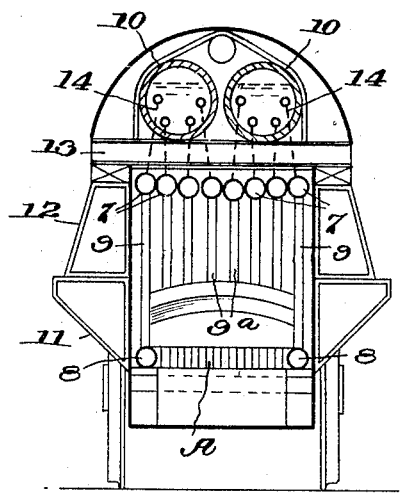
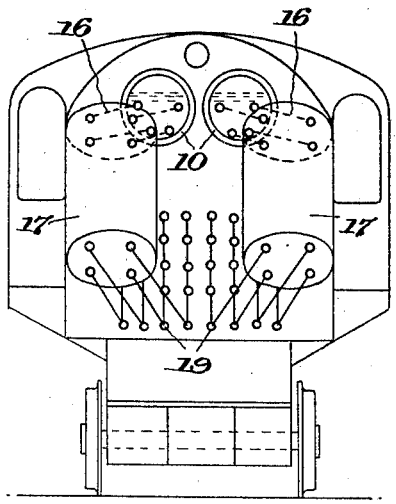
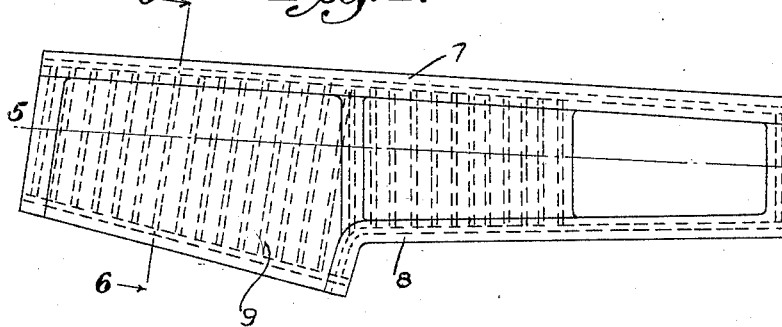
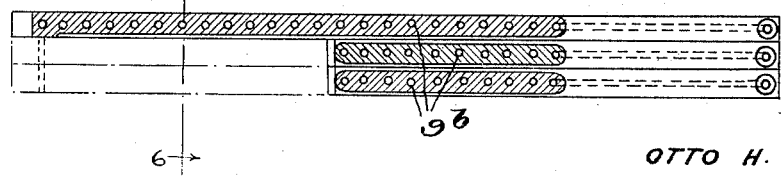
Inventor
OTTO H. HARTMANN April 10, 1928.
O. H. HARTMANN
1,665,543
TRAVELING PLANT FOR THE GENERATION OF HIGH PRESSURE STEAM
Filed Sept. 23, 1924  4 Sheets-Sheet 3
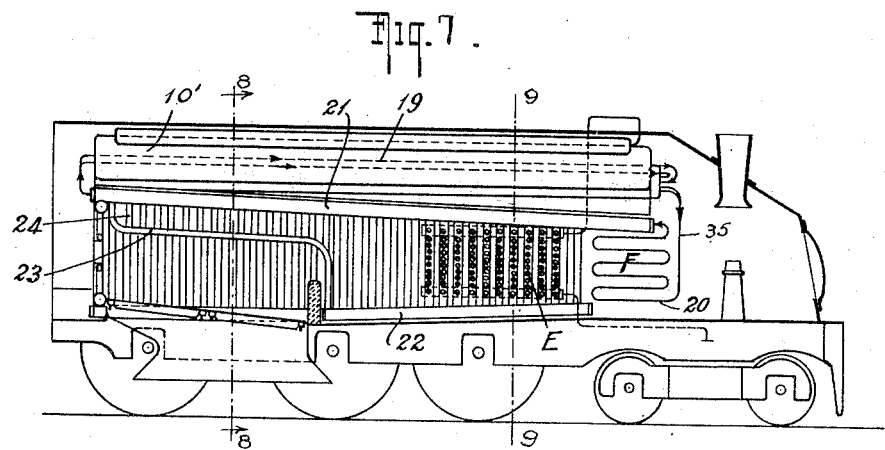
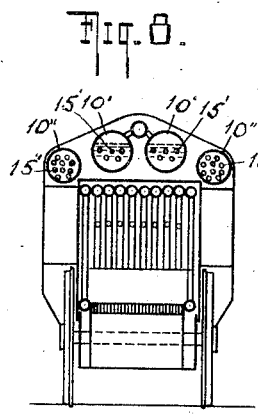 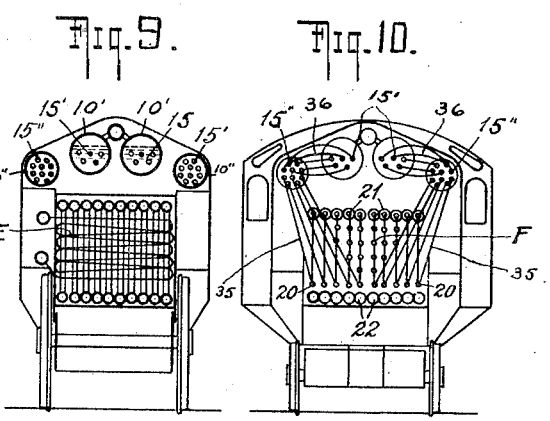
WITNESS
INVENTOR
OTTO H. HARTMANN
BY
ATTORNEYS April 10, 1928.

O. H. HARTMANN 1,665,543

TRAVELING PLANT FOR THE GENERATION OF HIGH PRESSURE STEAM

Filed Sept. 23, 1924 4 Sheets-Sheet 4

WITNESS

INVENTOR
OTTO H. HARTMANN
BY
ATTORNEYS

Patented Apr. 10, 1928.

1,665,543

UNITED STATES PATENT OFFICE.

OTTO H. HARTMANN, OF CASSEL-WILHELMSHOEHE, GERMANY, ASSIGNOR TO SCHMIDT'SCHE HEISSDAMPF GESELLSCHAFT, M. B. H., OF CASSEL-WILHELMSHOEHE, GERMANY, A CORPORATION OF GERMANY.

TRAVELING PLANT FOR THE GENERATION OF HIGH-PRESSURE STEAM.

Application filed September 23, 1924. Serial No. 739,255.

The present invention relates to portable or traveling plants for the generation of high-pressure steam. Heretofore traveling steam plants, particularly those intended for locomotive engines, have been made to produce steam of only relatively low pressure, say up to about 16 atmospheres. It has not been found possible hitherto to construct on a commercial scale boiler plants for pressures higher than this when they were to be used in conjunction with traveling engines, such as locomotives, portable engines, steam plows etc.

The object of the present invention is therefore to provide a boiler plant for locomotives or the like which will be able to generate steam at pressures up to 100 atmospheres and more, and which further will be adapted to the special conditions prevailing in such plants. These consist in unavoidable jars, shocks and vibrations which occur with traveling plants while moving along the track or the roadway. The employment of water-tube boilers in locomotives or the like has in the past been a failure because of these jars and vibrations which tend to loosen the connections between the tubes and the drums or like containers.

With the object of overcoming these disadvantages the plant according to the invention comprises a fire box, a channel for conveying the combustion gases from said fire box, and a plurality of steam-generating drums, in which steam is generated by indirect heating. For this purpose hollow members are provided which are located partly within said drums and partly outside them in the path of the combustion gases. All portions of these steam generating members are arranged in independent groups which may be disconnected individually without interrupting the operation of the plant. A very important feature of the boiler plant construction according to the present arrangement consists in the fact that all parts serving for the generation of steam proper are so arranged that a locomotive engine embodying the present invention will not only be of the same general shape or type as existing engines, but will also be within the standard dimensions.

Figure 12:
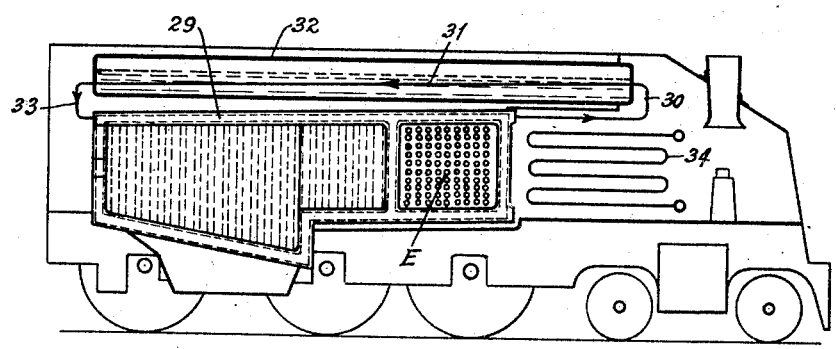

Several examples of the invention are illustrated in the accompanying drawings in connection with a high-pressure steam locomotive. In these drawings, Fig. 1 is a longitudinal section of a locomotive engine having a boiler plant with indirect heating according to the present invention; Fig. 2 is a cross-section on line 2—2 of Fig. 1; Fig. 3 is a front elevation of the locomotive; Fig. 4 is a face view of certain connecting members forming part of the steam-generating members in the locomotive illustrated by Figs. 1 to 3; Fig. 5 is a section on line 5—5 of Fig. 4; Fig. 6 is a section on line 6—6 of Figs. 4 and 5; Fig. 7 is a longitudinal section showing another type of high-pressure locomotive embodying the invention; Figs. 8 and 9 are sections on lines 8—8 and 9—9 respectively, of Fig. 7; Fig. 10 is a corresponding front elevation; Figs. 11 and 12 are longitudinal sections showing two additional forms of the invention in connection with high-pressure steam locomotives.

In the locomotive represented in Figs. 1 to 6, the combustion gases pass from the fire box B through the combustion channel C and smoke box D to the stack. The fire box B and the channel C are bounded by the upper and lower collectors 7 and 8 respectively, which are connected by upright side members 9, which are placed in contacting relation so as to form a continuous wall. Additional members 9ª extend vertically across the channel C and are spaced from each other to permit the passage of the hot gases. The members 7, 8, 9 and 9ª are hollow and intended to contain a liquid, preferably water. At a point where the combustion gases have been cooled off considerably, I arrange a superheater E adapted to be inserted and removed laterally. The collectors 7 are connected by tubes 14 with heat transfer devices of tubular character located in the water space of the drums 10 as indicated at 15. The outlets of the heating tubes 15 are connected by tubes 16 with a heat exchange device 17 located in the smoke box D. The hot water, or mixture of hot water and steam, passing from the collectors through the tubes 15, constitutes a heat carrier for generating steam, by indirect heating, from the water contained in the lower portions of the drums 10. This heat carrier then passes through the coils 18 of the device 17, and then returns to the collectors 7 through connecting pipes 19 and through a heater F, so that a continuous circulation path is afforded. It is, however, not absolutely essential that the heat carrier should travel through a continuous path. The device through which the heat carrier circulates is constructed in independent units or groups, that is, each collector 7 forms a unit with a collector 8 and tubular members 9, $9^a$, 14, 15, 16, 18, 19 and one of the pipes or coils of the heater F. Each of these units extends mainly lengthwise of the boiler and may be repaired or removed without affecting the operation of the other units, since there is no communication between any unit and the others.

The combustion gases pass from the combustion chamber B through the channel C to the smoke box D and out through the stack; the water or other liquid contained in the collectors 7 and 8, and in the connecting members 9 and $9^a$, becomes strongly heated so that steam is generated. This steam, or mixture of such steam and water, passes through the tubes 14 into the heating members 15 located in the drums 10. Through the walls of said members 15 the steam, or mixture of steam and water, gives off its heat to the water in said drum and high pressure steam is thus produced from said water. I have found that steam up to 100 atmospheres and over can thus be generated in the drums 10. The heating medium, traveling in the pipes 15, will gradually become cooler and the water produced by condensation will pass through the pipes 16, 18 and 19 to the heater F from which it returns to the collectors 7 so that a closed circulation path is obtained.

As has been stated above, the heat exchange device 17 is interposed between the tubes 16 and 19. From Fig. 3 it will be apparent that there are arranged in the smoke box two portions of such device, each being formed by a casing $17^a$ enclosing several coils 18. In this heat exchange device the water produced by condensation of the heat carrier gives off its heat for any useful purpose, for instance for the heating of feed water. As the heat of the condensation product is absorbed, its specific gravity increases and thus the circulation is insured by a thermosiphon action. By the arrangement of the heat exchange device 17 in the smoke box of the engine, I secure a good utilization of the forward portion of said smoke box. The forward portion of the heater F projects into the rear portion of the smoke box, the remaining portion of said heater lying just ahead of the forward end of the channel C. In that portion of the channel C which is nearest to the smoke box, I have arranged a superheater E.

In the construction of the invention just described I not only secure a very favorable mode of operation for the indirect generation of high pressure steam, but I also insure a very efficient utilization of the available space. It should be borne in mind that the shape and dimensions of a locomotive engine do not depend simply on custom but are really determined by natural conditions and that these dimensions must not be exceeded. The invention therefore not only provides an operative solution of the problem but one which is suitable for commercial use, particularly in the construction of a boiler plant for high pressure locomotive engines or for other conditions where portable or traveling boiler plants are desired.

The members 9 and $9^a$ which connect the upper collectors 7 with the lower collectors 8 are preferably constructed in the nature of plates or girders made with a suitable number of channels $9^b$ for the circulation of the heat carrier as clearly shown in Figs. 4, 5 and 6.

In Fig. 2 I have shown a construction which not only affords a very firm connection between the several parts of the boiler plant, but also is well adapted to minimize, or obviate altogether, the injurious effects of any jars or vibrations. The members 11, 12 and 13 which are connected with each other and braced together, form a rigid box-like structure which is so placed between the longitudinal boilers 10 and the frame of the locomotive that the drums 10 will receive the vibrations due to shocks. Thus the joints of the members through which the heat carrier flows will be protected from the direct influence of vibrations and from the resulting excessive strains.

In Figs. 7 and 10 I have illustrated another construction of a high pressure steam locomotive. The superheater E may be removed toward the left of Fig. 9 together with the steam chests or headers. To the left and to the right of the longitudinal drums 10' are located water drums 10" through which extend tubular members 15" connected by pipes 35 with the tubular members 20, and by pipes 36 with the tubular members 15' located within the water spaces of the drums 10'. The circulating heat carrier, while passing through the tubular members 15', gives off its heat to the water and produces the live steam therefrom. The members 20 form part of the heater F in which the relatively cool product obtained by the condensation of the heat carrier is pre-heated before admission to the upper collectors 21. The collectors 21 and 22 are connected by pipes 23 from which short branches 24 lead to the individual collectors 21. By this construction I provide a protective device in the upper portion of the fire box to shield the upper collectors 21 from excessive heating by the combustion gases in the fire box. The arrangement of the drums 10" at the upper portion of the locomotive has the advantage of giving a greater fall to the condensation product and thereby insuring or accelerating the circulation of the heat carrier. In this construction as well, the path for the circulation of the heat carrier is constructed in independent units or groups extending mainly lengthwise of the boiler and this is also true of the constructions illustrated by Figs. 11 and 12.

The invention may be carried out in various other ways. For instance, as indicated in Fig. 11, a device for pre-heating air on its way to the grate or combustion chamber may be arranged in the lower portion of the smoke box R as indicated at 25. A duct 26 connects this pre-heater with the space under the grate 27. From the fire box S the combustion gases pass through the channel T and then past the heater 25 into the smoke box and to the stack. The construction of the fire box and of the channel T is substantially the same as described in connection with the other forms of my invention. It will be noted that the channel 26 is located immediately below the lower collectors 28 through which a hot heat carrier circulates and thus the air coming from the heater 25 is further heated in the channel 26, or, at least, cooling of such air is prevented, and the air to support combustion therefore reaches the grate 27 in a highly heated condition.

In Fig. 12 I have shown a construction of a high pressure steam locomotive in which provision is made for the indirect heating of the water from which steam is generated and in which the direction of the flow of the heat carrier in its circulating path is opposite to that employed in the constructions described above. As indicated in the drawing by arrows, the heat carrier passes from the upper collectors 29 at their forward ends through connecting members 30 to the heating members 31 located in the water space of the boiler 32. The liquid resulting from the condensation of the heat carrier flows through connections 33 back into the upper collectors 29. The latter therefore are inclined upwardly toward the right in Fig. 12 while the heating devices 31 are inclined downwardly toward the left so as to promote the circulation. One of the advantages of this particular form of my invention is that the collectors 29 even at their hottest portion contain water which is converted into steam only after the water reaches a comparatively cooler zone. Since the left-hand portion of the collectors 29 is directly above the fire box, it is evidently most exposed to heat. Since with the arrangement just described the coolest portion of the condensation product is immediately above the fire box, it will be manifest that the danger of the collectors 29 burning out is very much reduced, if not avoided entirely. At the forward portion of Fig. 12, I have indicated at 34 a feed water heater adjacent to the superheater E.

Various modifications may be made without departing from the nature of my invention as set forth in the appended claims.

I claim:

1. A traveling boiler plant for generating high-pressure steam, comprising a fire box, a channel for conveying the combustion gases from said fire box, boiler drums above said fire box and channel, hollow upper collectors forming a protecting wall below said drums to shield them from direct contact with the combustion gases flowing through said fire box and said channel, lower collectors, hollow members connecting the upper collectors with the lower ones, tubes traversing said drums and adapted to transfer heat to the contents thereof, said collectors and connecting members being arranged in groups, each group being connected to one of said tubes, and being disconnectable therefrom to enable it to be removed without interrupting the operation of the plant.

2. A traveling boiler plant for generating high-pressure steam, comprising a fire box, a channel for conveying the combustion gases from said fire box, a steam generating drum, located at a higher level than said fire box, hollow collectors extending lengthwise of the boiler between said fire box and said channel, hollow members connecting said collectors, said hollow members and said collectors being exposed to the heat of the combustion gases, hollow heating members located in said drum, each of said heating members being associated with certain collectors and hollow connecting members to form therewith a group extending lengthwise of the boiler, and constituting a closed path for the circulation of a heating fluid, said groups being independent of each other and adapted to be independently disconnected without interrupting the operation of the plant.

3. A traveling boiler plant for generating high-pressure steam, comprising a fire box, a channel for conveying the combustion gases from said fire box, hollow collectors and hollow members connecting them arranged along said fire box and said channel and exposed to the heat of the combustion gases, a drum arranged above said collectors and adapted to contain water, and tubular elements traversing said drum and adapted to transfer heat to the water therein, said collectors and connecting members being arranged in independent groups, each group being connected to one of said tubular elements and being independently disconnectable therefrom to enable the group to be removed without interrupting the operation of the plant.

4. A traveling boiler plant for generating high-pressure steam, comprising a fire box, a channel for conveying the combustion gases from said fire box, a plurality of steam generating drums located at a higher level than said fire box, hollow steam-generating members adapted to produce steam by indirect heating and located partly within said drums and partly in the path of the combustion gases, said steam-generating members arranged in groups extending mainly lengthwise of the boiler, each group constituting a closed path for the circulation of a heating fluid and comprising, in addition to the portion for taking up heat from the combustion gases and the portion for giving off heat to the water of the drums, a portion for returning the condensate of that fluid to said first mentioned portion, said latter portion including means for heating the feed water by the heat of the condensate, said groups being independent of each other and adapted to be independently disconnected without interrupting the operation of the plant.

5. A traveling boiler plant for generating high-pressure steam, comprising a fire box, a channel for conveying the combustion gases from said fire box, a plurality of steam-generating drums located at a higher level than said fire box, hollow collectors extending lengthwise of the boiler attached to said fire box and to said channel, hollow members located in said drums, water drums located substantially at the same level as said steam-generating drums, tubular members located in said water drums and connected with said hollow heating members, preheating means located in the path of the combustion gases and connected to said tubular members and said hollow collectors to form groups with said collectors, said hollow heating members and said tubular members, each group constituting a closed path for the circulation of a heating fluid, said groups being independent of each other and adapted to be independently disconnected without interrupting the operation of the plant.

6. A traveling boiler plant for generating high pressure steam, comprising a fire box, a channel for conveying the combustion gases from said fire box, hollow collectors extending lengthwise of the boiler both above and below the axis of said channel, and hollow members connecting said collectors adjacent to said fire box and to said channel and exposed to the heat of the combustion gases, a boiler drum, connecting members extending from each end of said collectors to opposite ends of said drum to conduct heat from the collectors to the drum in a continuous circuit, said collectors and connecting members being arranged in independent groups arranged side by side and extending lengthwise of the boiler, and said groups being adapted to be independently disconnected from said connecting means without interrupting the operation of the plant.

7. A locomotive boiler plant comprising a water tube fire box, a combustion channel extending forwardly of said fire box, a steam-generating drum positioned above said fire box, hollow collectors forming the upper walls of said fire box and said combustion channel, lower collectors positioned below said combustion channel, hollow members connecting said lower collectors to said upper collectors, and tubular elements traversing said drum and adapted to transfer heat to the water therein, said collectors and hollow members being arranged in independent groups, each group being connected to one of said tubular elements and being independently disconnectable therefrom to enable the group to be removed without interrupting the operation of the locomotive.

In testimony whereof I have hereunto set my hand.

OTTO H. HARTMANN.